Oct. 26, 1948.  J. D. COLLETT, JR  2,452,224
GAS SAMPLING APPARATUS
Filed May 7, 1945  2 Sheets-Sheet 1
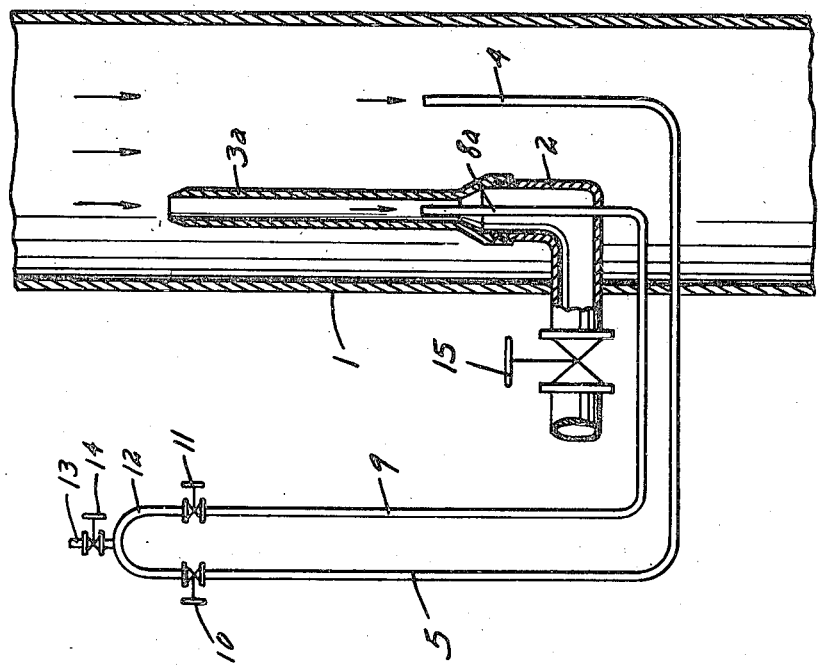
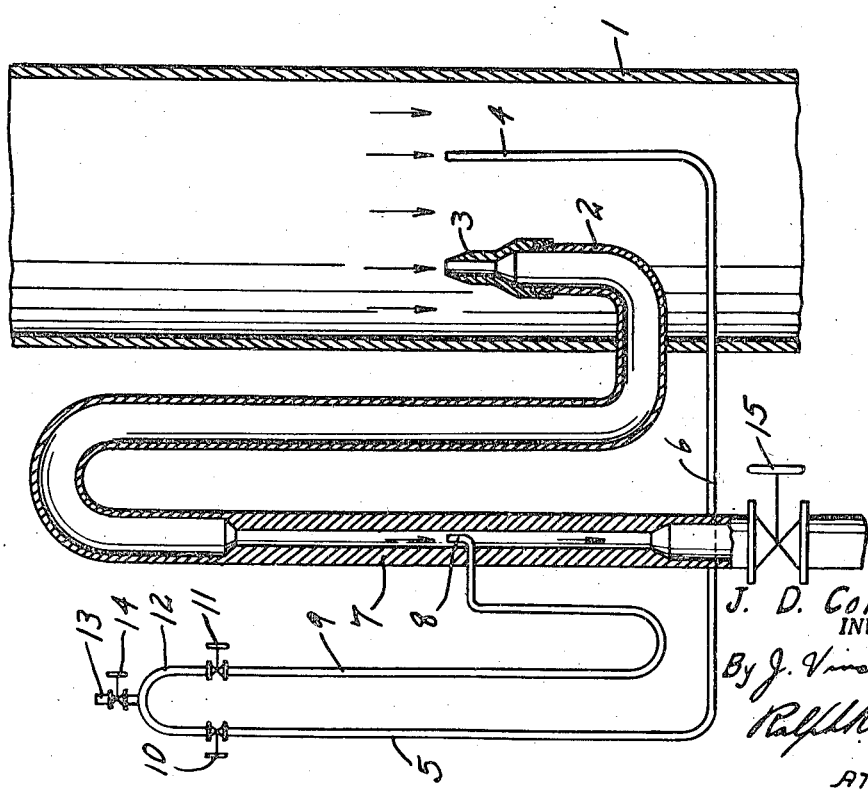
J. D. Collett, Jr.
INVENTOR.
ATTORNEYS J. D. Collett, Jr.
Inventor Patented Oct. 26, 1948

2,452,224

UNITED STATES PATENT OFFICE 2,452,224

GAS SAMPLING APPARATUS

James D. Collett, Jr., Houston, Tex.

Application May 7, 1945, Serial No. 592,476

4 Claims. (Cl. 73—421.5)

This invention relates in general to sampling devices and more particularly has reference to a device for taking samples from a flowing fluid in a conduit.

It is desirable in certain installations to obtain from a flowing stream of gas, vapor and condensate in the form of a suspension or fog a representative sample.

It has been found, however, that where a stream of such a mixture has a substantial diameter the velocities at different radial distances from the center of the stream will be different and the liquid contents of samples taken from the stream at such various different velocities will vary depending on the velocity at which the sample is taken. It has also been found that if a sampling nozzle is merely placed in the stream at a given point the sample obtained will not be taken at exactly the velocity at which the stream surrounding the nozzle is flowing unless special steps are followed to insure that the sample is taken at the desired velocity.

The principal object of the invention is to obtain from a flowing stream of a mixture of gas, vapor and condensate in the form of suspension or fog, a representative sample.

Another object of this invention is to make it possible to take the sample from a flowing stream with the sample being taken at the same velocity as the velocity of stream flow adjacent the point of taking the sample.

A further object of this invention is to take a number of samples from a flowing stream which taken together will give an accurate indication of the liquid content of the flowing stream.

A still further object of this invention is to provide apparatus and procedures for accomplishing the aforesaid objects.

With these and other objects in view, the present invention resides in the parts and combinations and steps and procedures hereinafter described and illustrated.

In order to facilitate an understanding of this invention, reference is made to the accompanying drawings.

In the drawings:

Figure 1 is a vertical sectional view through one form of apparatus for carrying out the present invention including a sampling tube and equipment for measuring the velocity of flow of fluid in the conduit from which the sample is taken and for measuring the velocity of flow of fluid entering the sampling tube.

Fig. 2 is a similar view of a modified form of apparatus.

Figure 3:
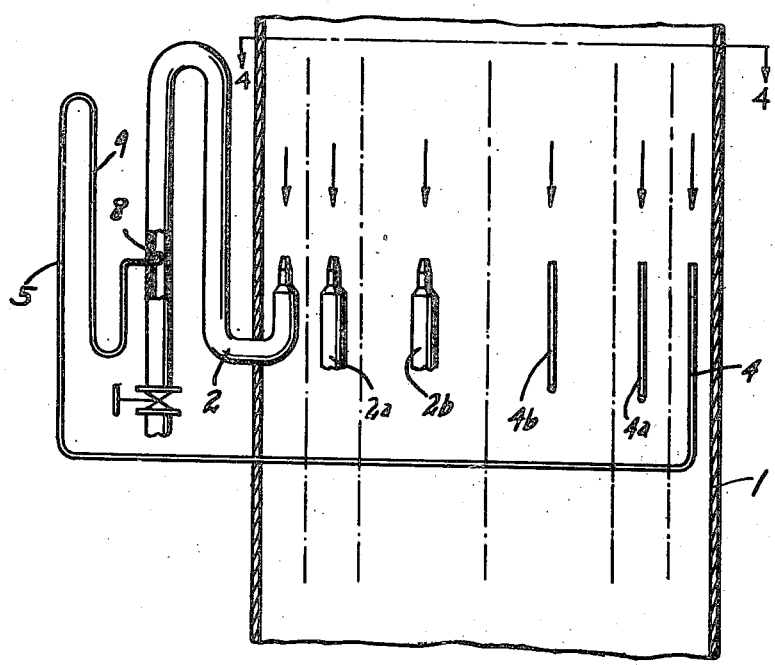
Fig. 3 is a similar view of still another modified form of structure in which means are provided for taking a plurality of samples simultaneously.

As shown in the drawings a flow conduit 1 is provided through which the stream of fluid to be sampled flows. Conduit 1 has been illustrated as being vertical, but it, of course, may be slightly inclined relative to the vertical although the vertical arrangement is preferred and gives the best results. A sampling tube 2 is positioned in conduit 1 and has an open end located to receive fluid flowing through the conduit. In the embodiments illustrated the open end of the sampling tube faces upwardly and fluid to be sampled flows downwardly through conduit 1. Sampling tube 2 has a nozzle 3 fitted on its open end and provided with an orifice of predetermined cross-sectional area.

Also within the stream at the same distance from the center of the stream as the sampling nozzle 3 and at the same horizontal level as the sampling nozzle there is placed an impact tube 4 corresponding to the velocity measuring portion of a Pitot tube. The velocity of the flowing stream against a liquid with which this Pitot tube is filled will tend to cause the liquid to flow from the stream out through the Pitot tube and a pressure will be generated within the Pitot tube corresponding to the velocity of the flowing stream. The pressure exerted on the liquid in the Pitot tube 4 is measured in the vertical column or leg 5 of said tube which communicates therewith by the lateral portion 6.

Now it is not known at just what velocity the mixture would enter the sampling tube if the outer end were merely left open because the differential of pressure between the inner and outer ends of the sampling tubes might be such as to cause flow into the sampling tube at a much greater velocity than the flow in the stream about the sampling tube. It is highly desirable that the flow into the sampling tube be at the same velocity as that existing in the stream about the sampling tube. For the purpose of determining the velocity of the fluid entering the sampling tube and bringing it to the same velocity as the fluid flowing in the stream being sampled, the sampling tube is extended to the outside of the main conduit 1 and at some suitable location outside of the main conduit is provided with a section 7 of the same internal cross section as the internal cross section of the orifice nozzle 3 of the sampling tube at its entrance. In this portion of the sampling tube there is placed a second impact or Pitot tube 8.

Tube 8 is connected at its lower end to the lower end of a vertical leg 9 which is positioned in close proximity to the leg 5 of the measuring tube 4 to facilitate comparison of the heights of the liquid columns in the two legs. As illustrated, the two legs 5 and 9 are provided with valves 10 and 11, respectively, at their upper portions and are connected together at their upper ends by an inverted U tube 12. At the uppermost portion of the U-section 12 a conduit 13 is connected which is provided with a valve 14. The conduit 13 and valves 10, 11 and 14 serve to fill the legs 5 and 9 and the respective Pitot tubes 4 and 8 with liquid.

For purposes of convenience the extreme impact ends of Pitot tubes 4 and 8 are at the same horizontal level so that when the flowing portions of the fluid impacting the tubes are moving at the same velocity the level of liquids in the measuring legs 5 and 9 will be at the same level. This also facilitates the filling of the two tubes with liquid because as constructed liquid can be added until it overflows the impact ends of both tubes and then both Pitot tubes will be automatically filled to the same level with liquid. This will result in columns of liquid appearing in the two measuring legs 5 and 9 at the same height when no pressure is exerted upon the surfaces of the liquids in the tubes 4 and 8.

It will be appreciated that the weight of the column of liquid in one of the legs 5 or 9 will be an indication of the pressure due to the velocity of liquid striking the respective impact tube 4 or 8 that is connected with that leg. After the two tubes are filled with liquid and the fluid to be sampled is flowing through the conduit 1 the level of liquid in tubes 4 and 8 will be depressed and the level of liquid in tube legs 5 and 9 will rise. If the liquid in the legs 5 and 9 come to the same level that will be an indication that the velocities of fluid striking the ends of the two impact tubes are the same. If this conditions exists, then the velocity of flow into the sampling tube must of necessity be the same as the velocity of flow in the main stream of fluid adjacent the sampling tube. If it be found that the levels in the two legs of the U-tubes are not the same, then a throttle valve 15 on the sampling tube may be opened to permit a greater velocity of flow through the sampling tube or closed to cut down on the velocity until the columns of liquid in the U-tube are at the same level. It is essential that the openings into the two impact tubes be at exactly the same level.

The impact tip in the sampling tube may if desired actually be placed in the intake portion of the sampling tube rather than in some remote portion having the same cross section. In Fig. 2 of the drawings a structure embodying this feature of the present invention is illustrated in which the impact leg 8a of the Pitot tube for measuring the velocity of flow through the sampling tube 2 is positioned in the elongated nozzle orifice 3a. This form of the invention operates identically to that shown in Fig. 1.

In order to obtain a more representative sample of the fluid flowing through the conduit 1 than could be obtained at any one point in a flow stream the present invention also contemplates the positioning of a plurality of sampling nozzles within the conduit 1 at various distances from the center thereof. Such an arrangement is shown in Figs. 3 and 4 of the drawings in which a plurality of sampling tubes 2, 2a, 2b, etc., are positioned with their respective nozzles at predetermined distances from the center of the conduit 1.

In accordance with the teachings of the present invention a plurality of impact legs 4, 4a, 4b, etc., of the Pitot tubes are positioned at distances from the center of the conduit 1 corresponding to the distances between said center of the conduit and the sampling nozzles of the conduits 2, 2a, 2b, etc., respectively.

The desirable positions of the sampling nozzles when a plurality are employed are midway of concentric zones of equal area. For instance, if three nozzles are to be placed in the conduit the area of the conduit should be divided into imaginary concentric zones, each having the same area as each of the others. In other words, a series of imaginary concentric circles 16 and 17 should be drawn as illustrated in Fig. 2 of the drawings. The radii of these circles would be such as to divide the area of the conduit into an inner circular zone 18, an intermediate annular zone 19 and an outer annular zone 20. Each of the three zones 18, 19 and 20 are of equal area. After so dividing the cross-sectional area of the conduit 1 the sampling tubes would be positioned with the tube 2 halfway between the inner and outer peripheries of the annular zone 20, the tube 2a halfway between the circles 16 and 17 and the tube 2b halfway between the center of the conduit 1 and the circle 16. Of course, the impact tubes 4, 4a and 4b would likewise be positioned at distances relative to the imaginary circles and center of the conduit 1 corresponding to the positioning of the nozzle ends of the impact tubes.

Figure 4:
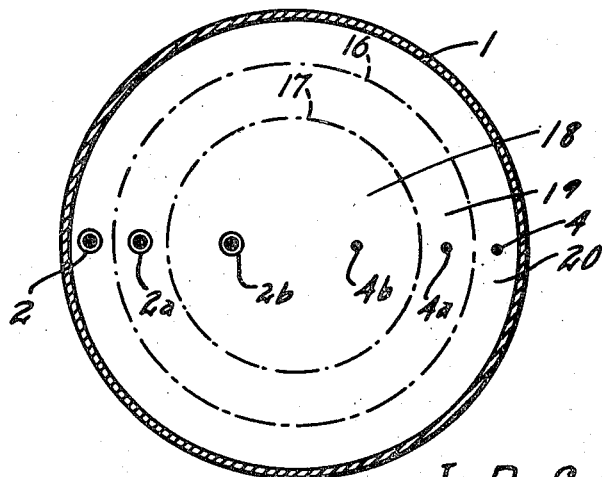
Fig. 4 is a sectional view taken on line 4—4 of Fig. 3.

Each of the tubes 2a, 2b, 4a and 4b are connected with equipment identical to that shown associated with the tubes 2 and 4 in Fig. 3. The details of this showing have been omitted to simplify the illustration of the invention in the drawings.

With the structure more or less diagrammatically illustrated in Figs. 3 and 4 of the drawings, a plurality of samples which would give a more accurate representation of the cross section of the stream of fluid flowing through the conduit 1 can be obtained.

From the foregoing description it will be appreciated that the present invention provides novel methods and equipment for obtaining samples of fluid from a flowing stream thereof.

Having described my invention, I claim:

1. In an apparatus for taking samples of a fluid flowing through a conduit, a sampling nozzle disposed in said conduit and provided with an intake orifice facing upstream and positioned a predetermined distance from the center of said conduit, a Pitot tube having its impact receiving end facing upstream and positioned from the center of said conduit a distance equal to that at which the nozzle orifice is spaced, and a second Pitot tube having its impact receiving end disposed in said nozzle and facing upstream, said Pitot tubes having measuring columns disposed in juxtaposed parallel relation and having their impact faces disposed at the same horizontal level.

2. In an apparatus for taking samples of a fluid flowing through a conduit, a sampling nozzle disposed in said conduit and provided with an intake orifice facing upstream and positioned a predetermined distance from the center of said conduit, a Pitot tube having its impact receiving end facing upstream and positioned from the center of said conduit a distance equal to that at which the nozzle orifice is spaced, a pipe connected to said nozzle for receiving the sample, said pipe having a constricted portion equal in cross section to that of the nozzle orifice, and a second Pitot tube having its impact receiving end disposed in said constricted portion of the pipe and facing upstream relative to the flow through said pipe, said Pitot tubes having measuring columns disposed in juxtaposed parallel relation and having their impact faces disposed at the same horizontal level.

3. In an apparatus for taking samples of a fluid flowing downwardly through a vertically extending conduit, a sampling nozzle disposed in said conduit and provided with an intake orifice facing upstream and positioned a predetermined distance from the center of said conduit, a Pitot tube having its impact receiving end facing upstream and positioned from the center of said conduit a distance equal to that at which the nozzle orifice is spaced, and a second Pitot tube having its impact receiving end disposed in said nozzle and facing upstream, said Pitot tubes having measuring columns disposed in juxtaposed parallel relation and having their impact faces disposed at the same horizontal level.

4. In an apparatus for taking samples of a fluid flowing downwardly through a vertically extending conduit, a sampling nozzle disposed in said conduit and provided with an intake orifice facing upstream and positioned a predetermined distance from the center of said conduit, a Pitot tube having its impact receiving end facing upstream and positioned from the center of said conduit a distance equal to that at which the nozzle orifice is spaced, a second Pitot tube having its impact receiving end disposed in said nozzle and facing upstream, said Pitot tubes having measuring columns disposed in juxtaposed parallel relation and having their impact faces disposed at the same horizontal level, and means common to said Pitot tubes for filling them with measuring liquid.

JAMES D. COLLETT, Jr.

REFERENCES CITED

The following references are of record in the file of this patent:

UNITED STATES PATENTS

| Number | Name | Date |
| --- | --- | --- |
| 1,100,171 | Brown | June 16, 1914 |
| 1,364,035 | Carter | Dec. 28, 1920 |
| 2,030,682 | Campbell | Feb. 11, 1936 |
| 2,245,679 | Kelley | June 17, 1941 |
| 2,363,625 | Swearingen | Nov. 28, 1944 |
| 2,423,394 | Lee | July 1, 1947 |

FOREIGN PATENTS

| Number | Country | Date |
| --- | --- | --- |
| 469,665 | Germany | Dec. 20, 1928 |

OTHER REFERENCES

Brady et al., J. Ind. and Eng. Chem., 3, 662, 670 (1911).

Place, The Chemist Analyst, 19, January 1, 1930, pages 17 and 18.